Oct. 21, 1958     L. L. FERSTANDIG ET AL     2,857,416
PREPARATION OF ISOPHTHALONITRILE AND TEREPHTHALONITRILE
Filed Feb. 28, 1957
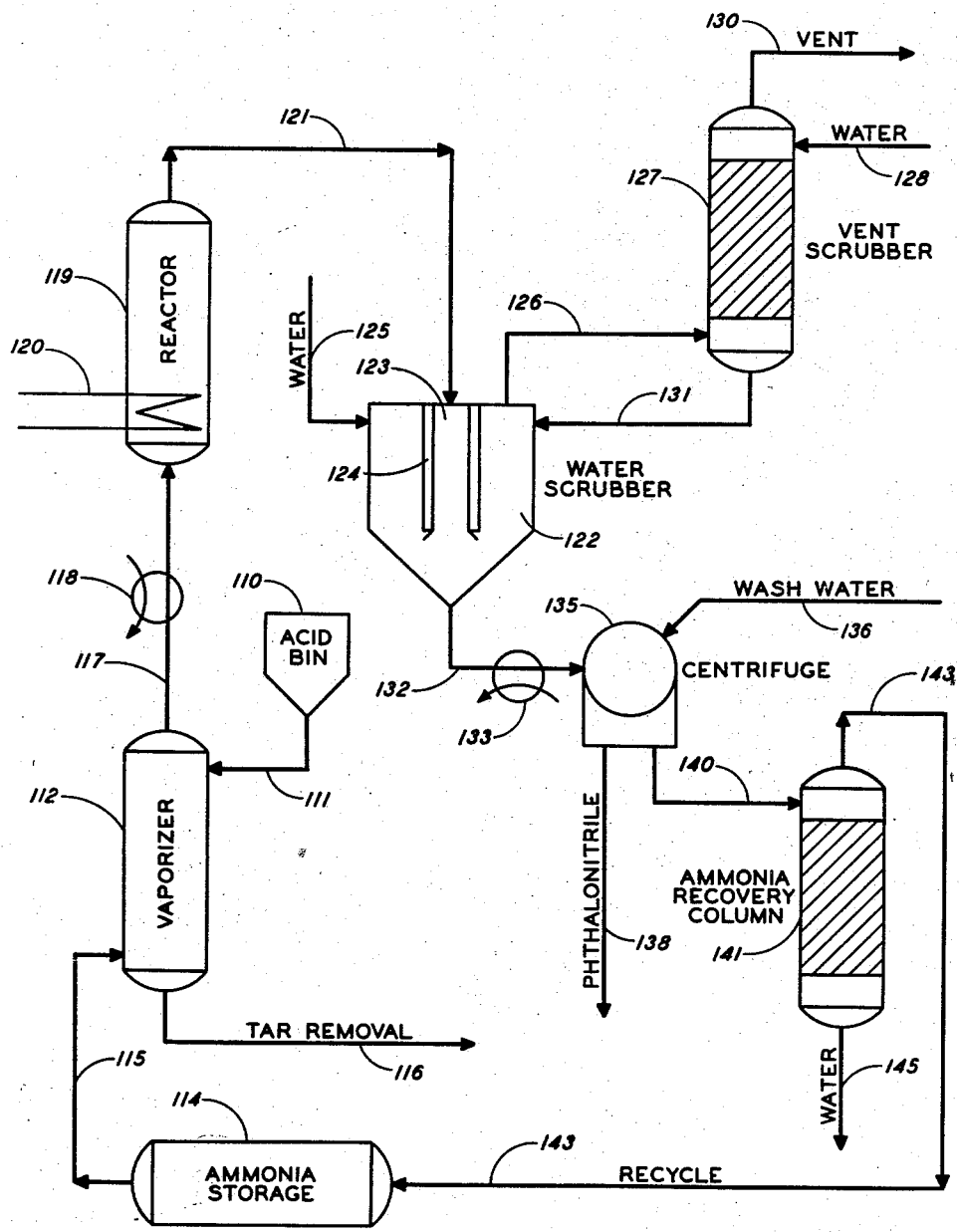
INVENTORS
LOUIS L. FERSTANDIG
JOHN B. WILKES
BY
ATTORNEYS

2,857,416

PREPARATION OF ISOPHTHALONITRILE AND TEREPHTHALONITRILE

Louis L. Ferstandig, El Cerrito, and John B. Wilkes, Albany, Calif., assignors to California Research Corporation, San Francisco, Calif., a corporation of Delaware Application February 28, 1957, Serial No. 643,166

13 Claims. (Cl. 260—465)

This invention relates to a process for the preparation of phthalonitriles from phthalic acids. More particularly, the invention relates to the preparation of isophthalonitrile and terephthalonitrile from solid isophthalic and terephthalic acids.

This application is a continuation-in-part of our copending application Serial No. 437,616, filed June 18, 1954, now abandoned.

Phthalonitriles prepared from isophthalic acid and terephthalic acid having their nitrile groups in non-adjacent positions on the benzene nucleus are particularly valuable as intermediates in the production of superior fiber-forming linear polymers. Phthalonitriles are also valuable as plasticizers and alkyd resin modifiers, as pesticides, and as intermediates in organic synthesis, such as the manufacture of amines, acids, amides, and complex nitrogenous dyestuffs.

It is known in the prior art to prepare aliphatic nitriles and one aromatic nitrile, namely, ortho-phthalonitrile, by contacting suitable nitrile-producing materials with a dehydration catalyst in the presence of ammonia. Because of the generally low boiling and melting points of these materials, no particularly difficult process problems are involved. Thus, it has been proposed first to completely melt or vaporize the nitrile-producing material and thereafter to combine it with ammonia in a reaction zone for contact with the dehydration catalyst. However, the foregoing prior art practice in the preparation of aliphatic nitriles and ortho-phthalonitrile by reacting phthalic acids with ammonia in the presence of a catalyst is not suited to the preparation of isophthalonitrile or terephthalonitrile. The boiling points and melting points of isophthalic and terephthalic acids are so high that the heat required to render them fluid, either in molten or vapor form preparatory to introducing them into the catalytic reaction zone, causes undesirable decomposition products, with resultant losses in yield and purity of finished product. Prior art practice also includes a one-stage non-catalytic method wherein phthalic acids are contacted with ammonia to produce phthalonitrile; however, this method is limited to contact temperatures low enough to inhibit or suppress the formation of cyanobenzoic acids.

The foregoing prior art limitations and difficulties in preparing nitriles from isophthalic and terephthalic acid are overcome by the process of the present invention, wherein in a first non-catalytic stage ammonia and phthalic acid are contacted in a reaction incomplete enough to convert substantially all of the acid to phthalonitrile, but which converts a portion of the acid to phthalonitrile, converts a portion to ammonia-acid reaction products intermediate between phthalic acid and phthalonitrile, and leaves a portion of the acid unconverted. In a second, and catalytic, stage, a completion reaction takes place, in which certain intermediate reaction products are further reacted to the desired phthalonitrile. The kind and degree of reactions involved may be better understood from the following illustration of the overall reaction of phthalic acid to phthalonitrile in the presence of ammonia.

In general, the overall reaction in the conversion of phthalic acid to nitrile by reaction with ammonia may be illustrated as follows, using isophthalic acid as an example:

$$C_6H_4(COOH)_2 + 2NH_3 \rightarrow C_6H_4(CN)_2 + 4H_2O$$

In arriving at the final product, it is believed that ammonia-acid reaction products or products partially converted to the final nitrile are formed in accordance with the following equations:

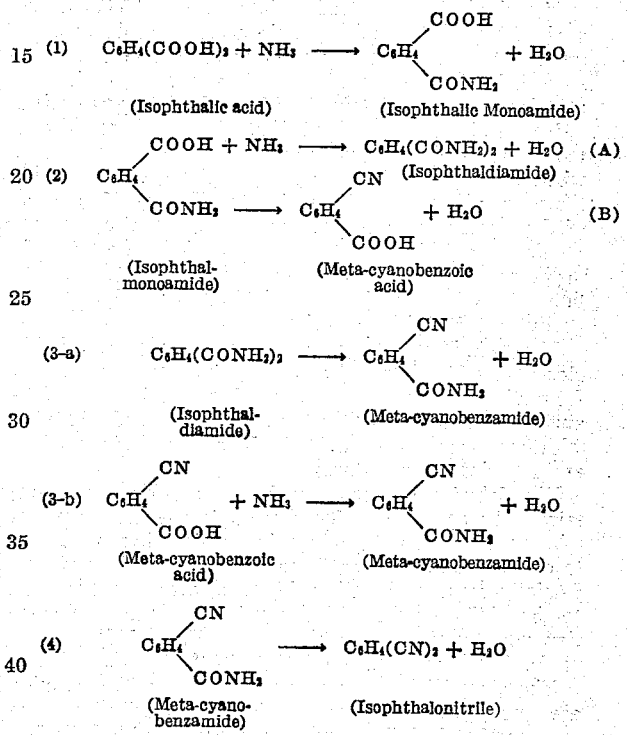

In more detail, according to the present invention, the prior art difficulties in preparing nitriles from isophthalic and terephthalic acids are overcome by: continuously charging at least one solid-form acid from the group consisting of isophthalic acid and terephthalic acid into a volatilization, or melt, zone; maintaining said zone at a temperature above about 500° F. and below the melting point of said acid; continuously passing gaseous ammonia through said zone, in contact with said acid in said zone, in sufficient quantities to cause to be formed in said zone a molten and relatively volatile mass comprising unreacted portions of said acid and partially reacted portions of said acid comprising ammonia derivatives of said acid, e. g., cyanobenzoic acid, and in sufficient quantities to serve as a carrier for the vapors of said mass; continuously passing from said zone to a dehydration zone said vapors and carrier ammonia; and contacting said vapors in said dehydration zone in the presence of a dehydration catalyst, for example, alumina, to remove water and convert unreacted acid and partially reacted acid to phthalonitrile. Following such procedure, phthalonitrile so produced is separated from the effluent from said dehydration zone. Preferred methods of accomplishing such separation are: (1) passing said effluent into a body of water in a recovery zone maintained at below about 175° F. to precipitate the phthalonitrile, and separating out the crystallized phthalonitrile, or (2) by passing said effluent into a recovery zone and into a liquid therein which is a solvent for phthalonitrile, said solvent being maintained in said zone at a temperature, for example, above about 200° F., where it will dissolve the phthalonitrile, and recovering phthalonitrile from the effluent from said recovery zone, for example, by reducing the temperature of said effluent to at least the temperature at which the phthalonitrile crystallizes in said solvent, and separating out the crystallized phthalonitrile. In the case of (2), a suitable solvent is an organic liquid, for example, alcohol, or, preferably, an aromatic hydrocarbon. Of the alcohols, isopropyl alcohol is preferred. Of the aromatic hydrocarbons, xylene is preferred. If desired, the solubility of the phthalonitrile in the solvent may be varied by using a mixed solvent, for example, a mixture of alcohol and an aromatic hydrocarbon, and by adjusting the proportions of the mixture to obtain the desired solubility.

If desired, the recovered phthalonitrile may be further purified by suitable means, for example, washing, recrystallizing from suitable solvents such as acetone or xylene, and distillation. However, for most uses a product of sufficient purity is obtained without further purification.

It has been ascertained that the above-mentioned molten and relatively volatile mass, or melt, is formed when 5 to 70% of the carboxyl groups have reacted with the ammonia. A suitable melt is one having 10 to 30% of the number of carboxyl groups reacted with the ammonia. As will occur to those skilled in the art, this number may be determined by an acid number determination, and controlled by rate of removal of the volatile products and addition of acid.

The volatilization, or melt, zone may be a suitable closed vessel maintained at a pressure which may range from about 0.1 atmosphere to 20 atmospheres, preferably from about 0.8 to 3 atmospheres, and provided with heating means to maintain the contents of the vessel at the desired temperatures.

The dehydration zone may be a tube or column containing the appropriate dehydration catalyst and provided with heating means to supply the requisite heat necessary to effect the conversion of unreacted phthalic acid and partially reacted phthalic acid, e. g., cyanobenzoic acid, to the phthalonitrile. The temperature in the dehydration zone may be from about 650° F. to 900° F., and preferably from about 700° F. to 800° F.

The dehydrating catalysts employed in the reaction are known to the art and have been described in such texts as "Catalysis," by Berkman, Morrell and Egloff. For present purposes catalysts such as activated alumina, silica and thoria, which are stable at the temperatures of operation, are particularly satisfactory. Other catalysts include oxides of zirconium, beryllium, tungsten and vanadium and basic aluminum phosphate, basic aluminum sulfate, and phosphoric acid. If a support for the catalyst is desired, such materials as Alundum, and the like, may be employed.

The invention will be further understood, and other objects, features, and advantages thereof will become apparent, from the following description when read in connection with the accompanying drawing, which diagrammatically illustrates one embodiment of process flow paths and apparatus for carrying out the process of the invention, including a phthalonitrile recovery system utilizing water as a precipitating medium for the phthalonitrile.

Referring now to the drawing, solid isophthalic acid or terephthalic acid, or mixtures of these acids, are fed from acid bin 110 through line 111 into melt zone or vaporizer 112 provided with suitable means for heating, e. g., a heating jacket, not shown. The acid may be introduced into the vaporizer by means of a screw conveyor, not shown, or by gravity. Less desirably, the acid may be introduced in the form of an aqueous slurry, less heat and smaller vessel capacity being required to vaporize the acid as slurry thickness is increased. The contents of the vaporizer are heated to a temperature between about 500° F. and 750° F., preferably from about 600° F. to 700° F., while a gaseous stream of preheated ammonia taken from ammonia storage vessel 114 through line 115 is passed through or over the contents of the vaporizer, whereupon a melt of acid and complete and partial reaction products of the acid is formed. Degradation or undesirable side reaction products, generally having a tarry appearance, may be withdrawn from the vaporizer through line 116. Sufficient ammonia is passed through or over the melt to react with the acid and to sweep out the volatile organic gases while phthalic acids are continuously added to the vaporization zone 112. In general, amounts of ammonia passed through the melt ranging from about 2 moles to 25 moles per mole of acid will be found satisfactory. The gaseous ammonia stream carrying organic volatile products passes from the vaporizer through line 117 through preheater 118 into dehydration reactor or zone 119, filled with catalyst, e. g., activated alumina, and provided with means for heating, such as coil 120, to maintain the temperature in reactor 119 at between about 700° F. and 900° F. The space velocity of the acid charge to the dehydration zone 119 may be from about 10 pounds per cubic foot per hour to about 350 pounds per cubic foot per hour, with particularly good results being obtained within a range of about 20–150 pounds per cubic foot per hour. The reaction products formed in zone 119 are maintained in vapor form and are withdrawn therefrom through line 121 with heating means provided, if necessary, to insure that the effluent reaction products will remain in the vapor form. These gaseous products are then passed into tank or water scrubber 122, partially filled with water introduced thereunto through line 125, inlet 123 being provided with insulating means, such as an evacuated space 124, to prevent crystallization of phthalonitriles along the walls of the inlet. As the phthalonitrile vapors hit the water, crystals of phthalonitrile are produced and form a slurry with the water. Satisfactory scrubber operating conditions are: a slurry of about 80 to 90 weight percent water and a temperature ranging from about 60° F., preferably about 125° F., up to a temperature just below the boiling point of water, preferably up to 175° F. Under these conditions certain vapors, including some ammonia and entrained fines of phthalonitrile material which are not taken up by the water are withdrawn from the water scrubber through line 126 and sent to vent scrubber 127. Vent scrubber 127 may be a column provided with packing, e. g., Berl saddles or Raschig rings, wherein water scrubbing of the vapors occurs, water being introduced into the scrubber through line 128. Free vapors, e. g., carbon dioxide, are withdrawn from the vent scrubber through vent 130, while the washings may be returned through line 131 to the water scrubber. The bulk of phthalonitrile crystals in the aqueous slurry, and ammonia water, are withdrawn from the water scrubber through line 132, and, if desired, sent through cooler 133, and thence into centrifuge 135. The phthalonitrile crystals isolated in centrifuge 135 are washed with water introduced through line 136, and withdrawn through line 138. The washings and the water phase separated from the phthalonitrile crystals are then passed through line 140 into ammonia recovery distillation column 141. Ammonia is recovered overhead, and by means of line 143, returned to ammonia storage 114. Water is withdrawn from the distillation column 141 through line 145, and, if desired, may be recycled to the water scrubber.

It will be understood that when operation is conducted with an organic solvent in the recovery system, tank 122 will contain said solvent, and will be provided with suitable heating means. In such case make-up solvent, instead of water, may be supplied through line 125, and phthalonitrile dissolved in solvent will be withdrawn through line 132, for example, to a product drum, centrifuge 135 and ammonia column 141 being dispensed with.

The following examples further illustrate the invention.

Example 1

In an arrangement of process flow paths and apparatus similar to those illustrated in the drawing, solid isophthalic acid was fed to the melt zone or vaporizer. While the acid was heated to a temperature of 575° F., ammonia gas was charged to the vaporizer in an amount of about 10 moles of ammonia per mole of acid under a pressure of about 1 atmosphere. There was formed a melt comprising unreacted acid and ammonia-acid reaction products partially converted to the nitrile. The vapors of these materials were withdrawn from the melt zone by means of the gaseous ammonia stream, the resulting gaseous stream sent through a preheater, wherein it was heated to a temperature of 750° F., and then charged at a space velocity of 75 pounds per cubic foot per hour to a dehydration reactor packed with activated alumina, and maintained at a temperature of 750° F. Phthalonitrile thus produced was recovered from the effluent from the dehydration reactor by passing the effluent to a water scrubber, wherein isophthalonitrile crystallized and formed a dilute slurry with the water (about 90 weight percent water). The slurry was withdrawn from the water scrubber, filtered to recover the isophthalonitrile and the isophthalonitrile was washed and dried.

A 92.5 mole percent yield of isophthalonitrile of 99 weight percent purity was obtained.

Example 2

A mixture of 85 weight percent isophthalic acid, 15 weight percent terephthalic acid was employed. Reaction conditions were: ammonia to acid mixture ratio of 9 moles to 1; pressure in melt zone of 1 atmosphere; temperature in melt zone of 575° F.; space velocity in the dehydration zone of 150 pounds per cubic foot per hour; and temperature in the dehydration zone of about 740° F. A 96.5 mole percent of phthalonitriles of 99 weight percent purity was obtained.

Obviously, many modifications and variations of the invention may be made without departing from the spirit and scope thereof and all such modifications and variations are intended to be covered by the appended claims, except for specific limitations to the contrary in the claims.

We claim:

1. A process for converting an acid selected from the group consisting of isophthalic and terephthalic acids to the corresponding phthalonitrile, which comprises: maintaining a melt zone at a temperature of from about 500° F. to 750° F.; continuously charging said acid and a stream of ammonia to said zone; continuously withdrawing vapor-form ammonia and vapor-form reaction products, including phthalonitrile, from said zone; adjusting the ammonia and acid charging rates to said zone and the vapor withdrawal rate from said zone to obtain in said zone a partial reaction of said acid to phthalonitrile, to the extent that from about 5% to 70% of the carboxyl groups of said acid have been reacted with ammonia; passing said withdrawn ammonia and reaction products to a dehydration zone, contacting said reaction products in said dehydration zone with a dehydration catalyst at a temperature of from about 650° to 900° F., and recovering phthalonitrile from the effluent from said dehydration zone.

2. The process of claim 1, wherein from about 10% to 30% of the carboxyl groups are converted to nitrile groups in said melt zone.

3. The process of claim 1, wherein sufficient ammonia is charged to said melt zone to serve both as a reactant in said zone and as a carrier gas for the withdrawal of reaction products from said zone, and wherein said reaction products are withdrawn from said zone in a stream of said ammonia carrier gas.

4. The process of claim 1, wherein said melt zone is maintained at a pressure of from 0.1 to 20 atmospheres.

5. The process of claim 1, wherein the acid is isophthalic acid.

6. A process for producing a phthalonitrile, which comprises continuously charging at least one solid acid selected from the group consisting of isophthalic and terephthalic acids and a gaseous ammonia stream to a melt zone, said melt zone being maintained at a temperature of from about 500° F. to 700° F. and containing previously charged acid of which 5 to 70 percent of the carboxylic groups have reacted with ammonia, continuously withdrawing from said melt zone volatile products by means of the gaseous ammonia stream, and contacting said volatile products with a dehydration catalyst in a dehydration zone maintained at a temperature between 700° F. and 800° F. to form the phthalonitrile, passing the resulting vaporous mixture containing the nitrile into a body of water maintained at a temperature below about 175° F. to precipitate the phthalonitrile and to form a dilute slurry of the precipitated phthalonitrile and water, and recovering the phthalonitrile characterized by a high degree of purity.

7. A process according to claim 6, wherein said previously charged acid has about 10 to 30% of the carboxyl groups reacted with ammonia.

8. A process according to claim 7, wherein the acid is isophthalic acid.

9. A process according to claim 8, wherein the dehydration catalyst is activated alumina.

10. The process of claim 1, with the additional steps of recovering phthalonitrile from the effluent from said dehydration zone by passing said effluent into a recovery zone and into a liquid therein selected from the group consisting of solvents for phthalonitrile and water, and recovering phthalonitrile from said liquid.

11. The process of claim 10, wherein said liquid is water maintained in said recovery zone at a temperature below about 175° F. to precipitate the phthalonitrile and to form a dilute slurry of the precipitated phthalonitrile and water, and wherein phthalonitrile is recovered from said slurry.

12. The process of claim 10, wherein said liquid is a hydrocarbon-containing solvent for phthalonitrile, maintained in said recovery zone at a temperature above about 200° F., with the additional steps of recovering phthalonitrile from the effluent from said recovery zone by reducing the temperature of said effluent to at least the temperature at which the phthalonitrile crystallizes in said solvent, and separating phthalonitrile crystals from said solvent.

13. The process of claim 10, wherein said liquid is an aromatic hydrocarbon.

References Cited in the file of this patent

UNITED STATES PATENTS 2,773,891    Toland et al.    Dec. 11, 1956